United States Patent
Peng (10) Patent No.: US 11,384,934 B2
(45) Date of Patent: Jul. 12, 2022

(54) METHOD OF SAFELY EMITTING HIGH-TEMPERATURE EXHAUST GAS FOR OFFSHORE PLATFORM, AND COOLING AND PURIFICATION DEVICE

(71) Applicant: Sigan Peng, Wuhan (CN)

(72) Inventor: Sigan Peng, Wuhan (CN)

( * ) Notice: Subject to any disclaimer, the term of this patent is extended or adjusted under 35 U.S.C. 154(b) by 719 days.

(21) Appl. No.: 16/483,807

(22) PCT Filed: Dec. 31, 2015

(86) PCT No.: PCT/CN2015/100084
§ 371 (c)(1),
(2) Date: Jan. 15, 2020

(87) PCT Pub. No.: WO2017/096669
PCT Pub. Date: Jun. 15, 2017

(65) Prior Publication Data
US 2020/0191390 A1 Jun. 18, 2020

(30) Foreign Application Priority Data
Dec. 6, 2015 (CN) .......................... 201510879955.3

(51) Int. Cl.
*F23J 15/04* (2006.01)
*F23J 15/06* (2006.01)
(Continued)

(52) U.S. Cl.
CPC .............. *F23J 15/04* (2013.01); *F23J 15/06* (2013.01); *B01D 53/507* (2013.01); *B01D 53/78* (2013.01);
(Continued)

(58) Field of Classification Search
CPC .................. F23J 2215/20; F23J 2219/40; F23J 2900/15041; F23J 15/04; F28C 1/02;
(Continued)

(56) References Cited

U.S. PATENT DOCUMENTS

| | | | | |
|---|---|---|---|---|
| 9,040,005 | B2 * | 5/2015 | Hansen | F01N 3/04 423/212 |
| 2015/0013314 | A1 * | 1/2015 | Westerbeke, Jr. | F01N 3/20 60/298 |
| 2018/0361312 | A1 * | 12/2018 | Dutra e Mello | B01D 53/24 |

FOREIGN PATENT DOCUMENTS

| CN | 101288823 A | 10/2008 |
|---|---|---|
| CN | 101314106 A | 12/2008 |

(Continued)

*Primary Examiner* — Timothy C Vanoy
(74) *Attorney, Agent, or Firm* — Dinsmore & Shohl LLP (57) ABSTRACT

A process for discharging high-temperature flue gas safely from an ocean platform includes discharging the gas from combustion facilities into a main body of a cooling and cleaning device through an exhaust pipe, while sea water is injected into the main body. The injected water passes through a water distributor located at an upper part, and the scrubbing sea water is sprayed downwards. The high-temperature flue gas enters into a lower part, and the gas is scrubbed by the sprayed sea water to be low-temperature clean flue gas. The low-temperature clean flue gas passes through the water distributor and a mist eliminator, and is discharged into atmosphere through an outlet at a top of the main body. The sea water is collected to a liquid pool located at a lower part of the main body and discharged into the ocean. A cooling and cleaning device is also disclosed.

10 Claims, 4 Drawing Sheets

(51) Int. Cl.
    *B01D 53/50* (2006.01)
    *B01D 53/78* (2006.01)
(52) U.S. Cl.
    CPC ........... *B01D 2252/1035* (2013.01); *B01D 2258/0283* (2013.01); *F23J 2215/20* (2013.01); *F23J 2219/40* (2013.01); *F23J 2900/15041* (2013.01)
(58) Field of Classification Search
    CPC .......... F01N 2590/02; F01N 2590/021; B01D 2252/1035; B01D 2258/0283; B01D 53/504; B01D 53/507; B01D 2257/302; B01D 53/78; B63B 43/00; B64C 17/00
    See application file for complete search history.

(56) References Cited

FOREIGN PATENT DOCUMENTS

| | | | | |
|---|---|---|---|---|
| CN | 201454392 U | | 5/2010 | |
| CN | 102 112 207 B | * | 6/2013 | ........... B01D 53/507 |
| EP | 2 301 647 A1 | * | 3/2011 | ......... B01D 53/1481 |
| EP | 3 028 760 A1 | * | 6/2016 | ............ B01D 53/18 |
| JP | S5284177 A | | 7/1977 | |
| JP | H0736885 B2 | | 4/1995 | |
| WO | WO 2013 004143 A1 | * | 1/2013 | ............. B01D 53/92 |

* cited by examiner

METHOD OF SAFELY EMITTING HIGH-TEMPERATURE EXHAUST GAS FOR OFFSHORE PLATFORM, AND COOLING AND PURIFICATION DEVICE

CROSS-REFERENCE TO RELATED APPLICATION

This application is the U.S. national stage of PCT/CN2015/100084 filed Dec. 31, 2015, which claims priority of Chinese patent application 201510879955.3 filed Dec. 6, 2015. The entire content of each application is incorporated herein by reference.

FIELD OF THE INVENTION

The present invention relates to a process for discharging high-temperature flue gas safely from an ocean platform and to a cooling and cleaning device, which are applicable to cool and clean the high-temperature flue gas generated from combustion facilities of ocean platforms and marine ships to eliminate the danger raised by the high-temperature flue gas and improve the safety and environmental protection of ocean platform. The present invention belongs to the technical field of ocean engineering.

BACKGROUND OF THE INVENTION

With the development of the world's oil industry in the ocean, there are more and more ocean oil and gas production facilities, resulting in the increasingly prominent problems on the safety and environmental protection. The first one is about safety. The high-temperature flue gas, which is generated by combustion facilities such as power stations or heat stations for providing power or thermal energy on the ocean platform, generally exceeds 300° C., for example 390° C. It poses a safety threat to the daily safe running of the platform, including fire-proof and explosion-proof, especially the frequent take-off and landing of helicopters mainly responsible for personnel traffic, and brings troubles to the design and construction of the ocean platform. The second one is about environmental protection. Emission of high-temperature flue gas from combustion facilities causes thermal pollution and smoke pollution, which damages the occupational health and working environment of staff on the ocean platform, which also has a gap with the international requirements of protecting the atmospheric environment.

However, the existing design, construction and running of ocean platform only provide a negative response to the safety problems caused by high-temperature flue gas, and almost provide no solution to the personnel occupational health and environmental protection problems.

For example, regarding the safety problem, according to the requirements of British standard CAP437, the temperature rise of ambient air in the flight area of take-off and landing of helicopter shall not exceed 2° C. in 3 seconds. Otherwise, it will reduce the lift of the helicopter's rotating shaft and the engine power margin, which will cause the engine surging, even stop or flameout. The existing solution is to collect a large number of weather forecasts, monitor wind direction and wind speed, and use numerical simulation, to predict the dangerous situation of the flight area above the helicopter deck that does not meet the requirements of the CAP437 standard, and then decide whether the helicopter performs the flight mission to avoid the danger. Another avoidance method is to change the arrangement design of flue gas exhaust pipe, such as to use horizontal exhaust, bringing new problems to the platform environment.

In a word, the temperature of the flue gas exhausted from the combustion facilities on the ocean platform is high, and the rise of the environmental temperature caused by the flue gas flow is vast and fast. In addition, the randomness of the local atmospheric turbulence is obvious, and the space of the ocean platform is very small. The existing method of "stop after prediction and monitoring" cannot fundamentally remove the threat of high-temperature flue gas to the safety, health and environmental protection of the ocean platform, even at the expense of the efficiency of the ocean platform.

SUMMARY OF THE INVENTION

The purpose of the present invention is to overcome the disadvantages of the prior art, and to provide a process for discharging high-temperature flue gas safely from an ocean platform and a cooling and cleaning device, so as to cool the high-temperature flue gas produced by the combustion facilities of the ocean platform and the marine ships to be below the boiling point of water, even to the room temperature, and reduce the sulfur dioxide and the smoke dust. It will fundamentally eliminate the danger and hazards to personnel, equipment and environment aroused by high-temperature flue gas from combustion facilities on the ocean platform and marine ships, so as to ensure that operation is safe and environmental protection requirements is met, which are applicable to the remodeling of existing marine facilities or the construction of new facilities.

The technical solution of the process for discharging high-temperature flue gas safely from an ocean platform of the present invention is set forth as below.

The process for discharging high-temperature flue gas safely from an ocean platform comprises steps of:

discharging high-temperature flue gas from combustion facilities into a main body of cooling and cleaning device through an exhaust pipe for high-temperature flue gas of the combustion facilities, while sea water is injected into the main body of cooling and cleaning device;

wherein, the injected sea water passes through a water distributor located at an upper part in the main body of cooling and cleaning device, and is sprayed downwards from the water distributor to be used as the scrubbing sea water;

the high-temperature flue gas enters into a lower part under the water distributor from an inlet for high-temperature flue gas located at a lower part in the main body of cooling and cleaning device, and the high-temperature flue gas is scrubbed by the sprayed sea water to be low-temperature clean flue gas;

the low-temperature clean flue gas passes through the water distributor and a mist eliminator for removing liquid drops which is located over the water distributor, and is discharged into atmosphere finally through an outlet for low-temperature clean flue gas located at a top of the main body of cooling and cleaning device; and the sea water for scrubbing the high-temperature flue gas is collected to a liquid pool located at a lower part of the main body of cooling and cleaning device and then discharged into the ocean.

Preferred embodiments are provided as below.

In the process for discharging high-temperature flue gas safely from an ocean platform, the step of spraying scrubbing sea water downwards from the water distributor comprises spraying scrubbing sea water to an empty space under the water distributor;

flow rate of the sea water injected into the main body of cooling and cleaning device is selected in a range according to a principal that a ratio of flue gas flow rate to sea water flow rate is 20-1000, wherein the flue gas flow rate is measured in $Nm^3/h$ and the sea water flow rate is measured in $m^3/h$;

inner diameter of the main body of cooling and cleaning device is 0.5-10 times of inner diameter of the exhaust pipe for high-temperature flue gas; and height of the empty space under the water distributor is 0.1-10 times of inner diameter of the exhaust pipe for high-temperature flue gas, wherein the height of the empty space refers to a distance between a bottom of the water distributor and a top of the inlet for high-temperature flue gas.

In the process for discharging high-temperature flue gas safely from an ocean platform, the step of spraying scrubbing sea water downwards from the water distributor comprises spraying scrubbing sea water to a packing layer located in an empty space under the water distributor;

flow rate of the sea water injected into the main body of cooling and cleaning device is selected in a range according to a principal that a ratio of flue gas flow rate to sea water flow rate is 30-500, wherein the flue gas flow rate is measured in $Nm^3/h$ and the sea water flow rate is measured in $m^3/h$;

inner diameter of the main body of cooling and cleaning device is 1-5 times of inner diameter of the exhaust pipe for high-temperature flue gas; and height of the packing layer is 0.1-10 times of inner diameter of the exhaust pipe for high-temperature flue gas.

The technical solution of the cooling and cleaning device for carrying out the process for discharging high-temperature flue gas safely from an ocean platform of the present invention is set forth as below.

The cooling and cleaning device for carrying out the process for discharging high-temperature flue gas safely from an ocean platform of the present invention comprises:

the main body of cooling and cleaning device;

the water distributor located at an upper part in the main body of cooling and cleaning device;

the mist eliminator located over the water distributor;

the outlet for low-temperature clean flue gas located over the mist eliminator;

wherein, the water distributor is connected to a sea water inlet of the main body of cooling and cleaning device and is communicated with a sea water delivering device through pipes;

the inlet for high-temperature flue gas of the main body of cooling and cleaning device is connected to the exhaust pipe for high-temperature flue gas the liquid pool and a water discharging outlet are located at the bottom of the main body of cooling and cleaning device;

the inlet for high-temperature flue gas is located under the water distributor; and the inner diameter of the main body of cooling and cleaning device is 0.5-10 times of the inner diameter of the exhaust pipe for high-temperature flue gas.

Preferred embodiments are provided as below.

In the cooling and cleaning device for carrying out the process for discharging high-temperature flue gas safely from an ocean platform of the present invention, the empty space is located between the bottom of the water distributor and the top of inlet for high-temperature flue gas, and the height of the empty space is 0.1-10 times of the inner diameter of the exhaust pipe for high-temperature flue gas.

In the cooling and cleaning device for carrying out the process for discharging high-temperature flue gas safely from an ocean platform of the present invention, the packing layer is located at the empty space under the water distributor;

the inlet for high-temperature flue gas is located under the packing layer;

the inner diameter of the main body of cooling and cleaning device is 1.1-4.5 times of the inner diameter of the exhaust pipe for high-temperature flue gas; and the height of the packing layer is 0.1-10 times of the inner diameter of the exhaust pipe for high-temperature flue gas.

In the cooling and cleaning device for carrying out the process for discharging high-temperature flue gas safely from an ocean platform of the present invention, the inner diameter of the main body of cooling and cleaning device is 1.2-3 times of the inner diameter of the exhaust pipe for high-temperature flue gas, and the height of the packing layer is 0.3-3 times of the inner diameter of the exhaust pipe for high-temperature flue gas.

In the cooling and cleaning device for carrying out the process for discharging high-temperature flue gas safely from an ocean platform of the present invention, the packings of the packing layer are resistant to a temperature of no less than 400° C.;

the packings are resistant to rapid cooling under 400° C.; and the sea water delivering device comprises a mechanism for controlling injection of sea water, which is used to start and stop delivery of sea water in the course of discharging high-temperature flue gas, and to regulate the flow rate of sea water.

In the cooling and cleaning device for carrying out the process for discharging high-temperature flue gas safely from an ocean platform of the present invention, the exhaust pipe for high-temperature flue gas extends to the inlet for high-temperature flue gas from the bottom of the main body of cooling and cleaning device;

the liquid pool is defined by an outer surface of the exhaust pipe for high-temperature flue gas and an inner surface of the main body of cooling and cleaning device; and a liquid proof cover for preventing the scrubbing seawater from entering is located over the inlet for high-temperature flue gas.

The technical effects of the process for discharging high-temperature flue gas safely from an ocean platform and of the cooling and cleaning device of the present invention are set forth as below.

1. The high-temperature flue gas flow of generally more than 300° C. from ocean platforms, marine ships and other power sources is reduced to below the boiling point of water, even to the room temperature. The emissions of sulfur dioxide and smoke dust are significantly reduced, while the cost and energy consumption is very low.

2. In particular, the exhaust of high-temperature flue gas of the platform itself will not affect the flight safety of frequent take-off and landing of helicopters. The dangerous situation, which disadvantageous wind direction cause that the temperature rise of the flight area of take-off and landing of helicopters above the deck exceeds 2° C. in 3 seconds (British standard CAP437), will never happen. At the same time, the danger of combustion and explosion in the production and living area on the ocean platform, which is easily caused by the exhaust of high-temperature flue gas, will also be eliminated.

3. The personnel occupational health and atmospheric environment are protected.

4. The problems on exhaust pipes of high-temperature flue gas and their arrangement in the prior art is eliminated. The running cost of the ocean platform is reduced. The design and construction of the ocean platform are more advanced, more reasonable, safer and more environmentally friendly.

BRIEF DESCRIPTION OF THE DRAWINGS

FIG. 4 is a schematic diagram showing another example of cooling and cleaning device of the present invention. The sea water passes a water distributor 2.4 and scrubs the flue gas in a packing layer 2.5. The high-temperature flue gas enters into an inlet for high-temperature flue gas 2.7 under the packing layer from an exhaust pipe for high-temperature flue gas 1.1 located at the bottom of the main body of cooling and cleaning device.

Names of components or structures corresponding to the reference numbers in the drawings are provided as below.

1—combustion facilities, 1.1—exhaust pipe for high-temperature flue gas, 1.2—thermal insulation layer, 2—cooling and cleaning device, 2.1—main body of cooling and cleaning device, 2.2—sea water inlet, 2.3—water discharging outlet, 2.4—water distributor, 2.5—packing layer, 2.6—liquid pool, 2.7—inlet for high-temperature flue gas, 2.8—liquid proof cover, 2.9—mist eliminator, 2.10—outlet for low-temperature clean flue gas, 2.11—exhaust pipe for low-temperature flue gas, 2.12—sea water delivering device, 2.13—water collecting pipe, 2.14—water discharging pipe.

DETAILED DESCRIPTION OF THE INVENTION

Combined with the figures and examples, further description on the process for discharging high-temperature flue gas safely from an ocean platform and the cooling and cleaning device of the present invention is provided as below.

Example 1

This is a basic example of the process for discharging high-temperature flue gas safely from an ocean platform of the present invention. As shown in FIGS. 2-5, the process for discharging high-temperature flue gas safely from an ocean platform comprises steps of:

discharging high-temperature flue gas from combustion facilities into a main body of cooling and cleaning device 2.1 through an exhaust pipe for high-temperature flue gas of the combustion facilities 1, while sea water is injected into the main body of cooling and cleaning device;

wherein, the injected sea water passes through a water distributor 2.4 located at an upper part in the main body of cooling and cleaning device 2.1 and is sprayed downwards from the water distributor to be used as the scrubbing sea water;

the high-temperature flue gas enters into a lower part under the water distributor 2.4 from an inlet for high-temperature flue gas 2.7 located at a lower part in the main body of cooling and cleaning device 2.1 and is scrubbed by the sprayed sea water to be low-temperature clean flue gas;

the low-temperature clean flue gas passes through the water distributor 2.4 and a mist eliminator 2.9 for removing liquid drops which is located over the water distributor, and finally is discharged into atmosphere through an outlet for low-temperature clean flue gas 2.10 located at a top of the main body of cooling and cleaning device 2.1; and the sea water for scrubbing the high-temperature flue gas is collected to a liquid pool 2.6 located at a lower part of the main body of cooling and cleaning device 2.1 and then discharged into the ocean.

The inner diameter of exhaust pipe for high-temperature flue gas 1.1 is configured according to related existing standards for exhaust pipe for high-temperature flue gas 1.1 of combustion facilities 1 on the design and construction of ocean platform.

After scrubbing the high-temperature flue gas, the sea water is collected to the liquid pool 2.6 at the lower part of the main body of cooling and cleaning device 2.1, and then discharged. The sea water can be directly discharged into the ocean below 5 m depth of the level. Such design is based on the fact that the discharging of scrubbing water for scrubbing flue gas of fossil fuel is generally harmless to the marine environment. Norway had approved a batch of coastal facilities to discharge scrubbing sea water for scrubbing flue gas of fossil fuel with pH <3 to the sea below 5 m depth of the level, which had been running for 30 years. China and the UK had approved large-scale coal-fired power plants to discharge the scrubbing sea water into a shallow depth, which had been running for more than 15 and 10 years respectively. In recent years, the discharging of scrubbing sea water for scrubbing the flue gas from heavy oil combustion of marine ship is permitted according to the conclusions of related reports of the United States Environmental Protection Agency (EPA) and the regulations of the International Maritime Organization (IMO) on the cleaning of flue gas of marine ship.

Example 2

Figure 1:
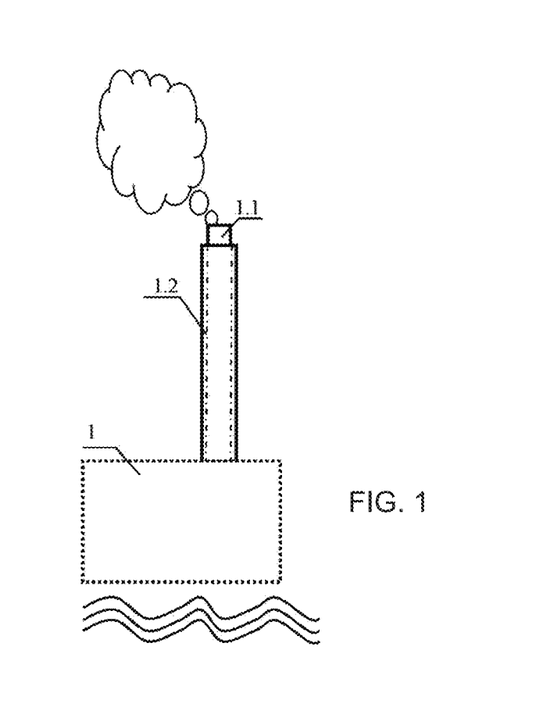
FIG. 1 is a schematic diagram showing the existing process for discharging high-temperature flue gas from an ocean platform, in which exhaust pipes for discharging high-temperature flue gas from an ocean platform has not been remodeled or the new design on the exhaust pipes for discharging high-temperature flue gas of newly constructed ocean platform has not been carried out.
Figure 2:
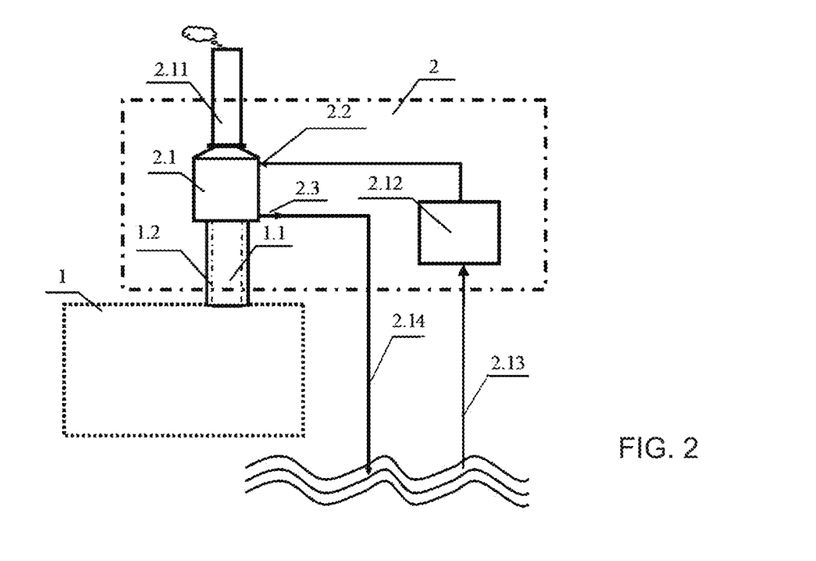
FIG. 2 is a schematic diagram showing the process for discharging high-temperature flue gas safely from an ocean platform of the present invention. The steps, including discharging high-temperature flue gas from combustion facilities into a main body of cooling and cleaning device through an exhaust pipe for high-temperature flue gas of the combustion facilities and injecting sea water into the main body of cooling and cleaning device, are shown in the figure.
Figure 3:
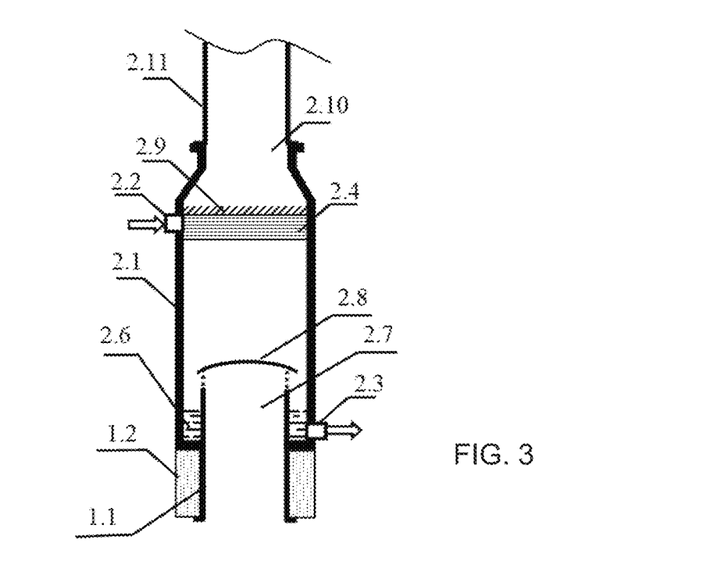
FIG. 3 is a schematic diagram showing an example of cooling and cleaning device of the present invention. The sea water passes a water distributor 2.4 and scrubs the flue gas in an empty space of the main body of the cooling and cleaning device 2.1. The high-temperature flue gas enters into an empty space under the water distributor 2.4 through an inlet for high-temperature flue gas 2.7 at the bottom of the main body of cooling and cleaning device.

This is a further example based on Example 1. As shown in FIGS. 2 and 3, the step of spraying scrubbing sea water downwards from the water distributor comprises spraying scrubbing sea water to an empty space under the water distributor;

flow rate of the sea water injected into the main body of cooling and cleaning device 2.1 is selected in a range according to a principal that a ratio of flue gas flow rate to sea water flow rate is 20-1000, wherein the flue gas flow rate is measured in $Nm^3/h$ and the sea water flow rate is measured in $m^3/h$;

the inner diameter of the main body of cooling and cleaning device 2.1 is 0.5-10 times of the inner diameter of the exhaust pipe for high-temperature flue gas 1.1; and the height of the empty space under the water distributor 2.4 is 0.1-10 times of the inner diameter of the exhaust pipe for high-temperature flue gas 1.1, wherein the height of the empty space refers to a distance between a bottom of the water distributor 2.4 and a top of the inlet for high-temperature flue gas 2.7.

Example 3

Figure 4:
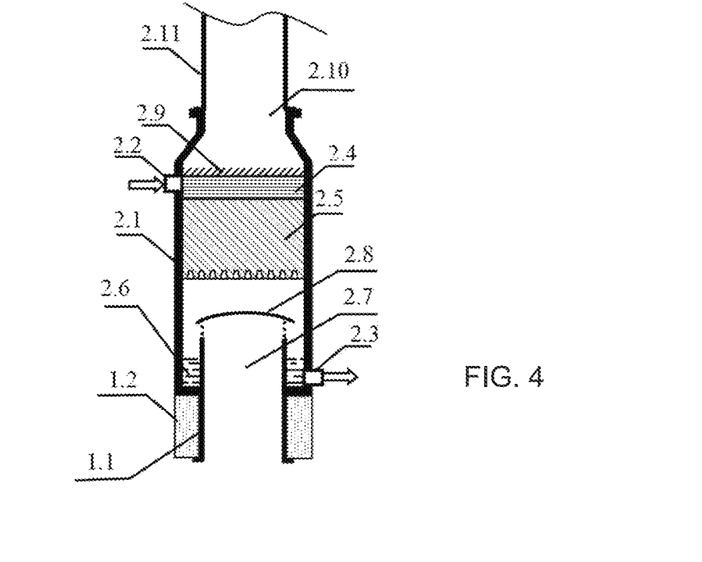
Figure 5:
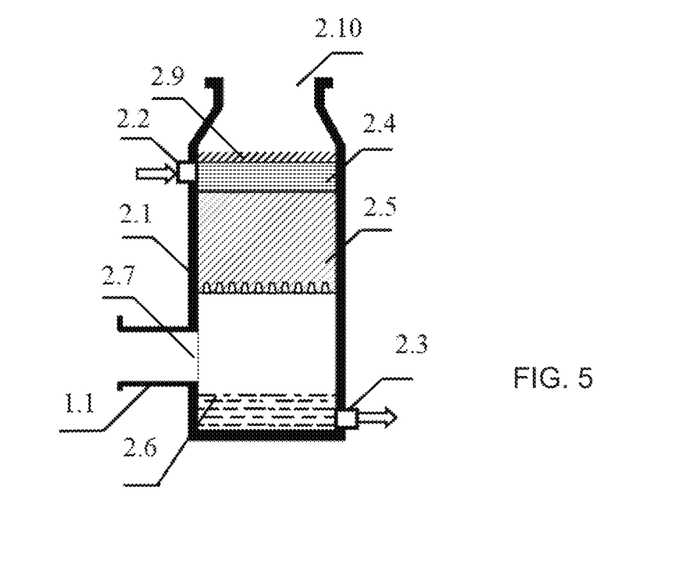
FIG. 5 is a schematic diagram showing another example of cooling and cleaning device of the present invention. The high-temperature flue gas enters into the main body of cooling and cleaning device 2.1 from an inlet for high-temperature flue gas 2.7 located on the lower side wall of the main body.
Figure 6:
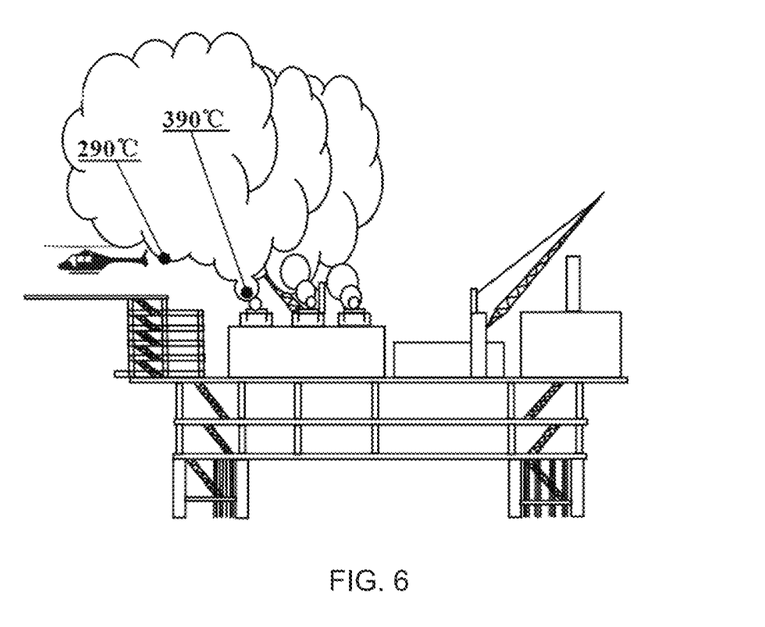
FIG. 6 is a schematic diagram showing that in an existing ocean platform, the high-temperature flue gas poses a safety threat to the take-off and landing of helicopter. The temperature of the center of the high-temperature flue gas reaches 390° C., and the temperature of the edge of high-temperature flow reaches 290° C.

This is a preferred example based on Example 1. As shown in FIGS. 2, 4 and 5, the step of spraying scrubbing sea water downwards from the water distributor comprises spraying scrubbing sea water to a packing layer located in an empty space under the water distributor;

flow rate of the sea water injected into the main body of cooling and cleaning device 2.1 is selected in a range according to a principal that a ratio of flue gas flow rate to sea water flow rate is 30-500, wherein the flue gas flow rate is measured in $Nm^3/h$ and the sea water flow rate is measured in $m^3/h$;

the inner diameter of the main body of cooling and cleaning device 2.1 is 1-5 times of the inner diameter of the exhaust pipe for high-temperature flue gas 1.1; and the height of the packing layer 2.5 is 0.1-10 times of the inner diameter of the exhaust pipe for high-temperature flue gas 1.1.

Example 4

This is a basic example of a cooling and cleaning device for carrying out the process for discharging high-temperature flue gas safely from an ocean platform of the present invention. As shown in FIGS. 2-5, the cooling and cleaning device for carrying out the process for discharging high-temperature flue gas safely from an ocean platform of the present invention comprises:

the main body of cooling and cleaning device 2.1;

the water distributor 2.4 located at a upper part in the main body of cooling and cleaning device 2.1;

the mist eliminator 2.9 located over the water distributor 2.4;

the outlet for low-temperature clean flue gas 2.10 located over the mist eliminator;

wherein, the water distributor 2.4 is connected to a sea water inlet 2.2 of the main body of cooling and cleaning device 2.1 and is communicated with a sea water delivering device 2.12 through pipes;

the inlet for high-temperature flue gas 2.7 of the main body of cooling and cleaning device 2.1 is connected to the exhaust pipe for high-temperature flue gas 1.1;

the liquid pool 2.6 and a water discharging outlet 2.3 are located at the bottom of the main body of cooling and cleaning device 2.1;

the inlet for high-temperature flue gas 2.7 is located under the water distributor 2.4; and the inner diameter of the main body of cooling and cleaning device 2.1 is 0.5-10 times of the inner diameter of the exhaust pipe for high-temperature flue gas 1.1.

Example 5

This is a further example based on Example 4. As shown in FIG. 2, the empty space is located between the bottom of the water distributor 2.4 and the top of inlet for high-temperature flue gas 2.7, and the height of the empty space is 0.1-10 times of the inner diameter of the exhaust pipe for high-temperature flue gas 1.1. Such configuration has advantages that the structure is simple and in the present example, the flue gas of generator set of ocean platform is treated by cooling and cleaning device 2, in which the temperature of 390° C. is reduced to about 90° C., and then is discharged. The water distributor 2.4 and mist eliminator 2.9 can be selected according to the requirements of design manual of chemical industry.

Example 6

This is a preferred example based on Example 4. As shown in FIGS. 3 and 4, the packing layer 2.5 is located at the empty space under the water distributor 2.4;

the inlet for high-temperature flue gas 2.7 is located under the packing layer 2.5;

the inner diameter of the main body of cooling and cleaning device 2.1 is 1.1-4.5 times of the inner diameter of the exhaust pipe for high-temperature flue gas 1.1; and the height of the packing layer 2.5 is 0.1-10 times of the inner diameter of the exhaust pipe for high-temperature flue gas 1.1.

Such configuration has advantages that the flue gas of combustion facilities of ocean platform is treated by cooling and cleaning device, in which the temperature of 390° C. is reduced to about 30° C., and then is discharged. In the present example, the ocean platform is newly designed. The inner diameter of the exhaust pipe for high-temperature flue gas 1.1 is configured according to related existing standards for exhaust pipe for high-temperature flue gas 1.1 of combustion facilities 1. The packing layer 2.5 is composed of Rasching ring and Pall ring of ceramic packings.

In above examples 1-6, as shown in FIGS. 2, 3, 4 and 5, because the flue gas passes the cooling and cleaning device 2 to be cooled so that the volume of flue gas is reduced greatly, the outlet for low-temperature clean flue gas 2.10 can join an exhaust pipe for low-temperature flue gas 2.11 with small inner diameter and with no thermal insulation layer, which saves a lot of materials and space for the design and construction of the platform.

Example 7

This is a further example based on Example 6. It is different from Example 6 that the inner diameter of the main body of cooling and cleaning device 2.1 is 1.2-3 times of the inner diameter of the exhaust pipe for high-temperature flue gas 1.1, and the height of the packing layer 2.5 is 0.3-3 times of the inner diameter of the exhaust pipe for high-temperature flue gas 1.1.

Example 8

This is a preferred example based on Example 6. It is different from Example 6 that the inner diameter of the main body of cooling and cleaning device 2.1 is 2 times of the inner diameter of the exhaust pipe for high-temperature flue gas 1.1, and the height of the packing layer 2.5 is 0.3 times of the inner diameter of the exhaust pipe for high-temperature flue gas 1.1. The material of packings is selected from anti-corrosive metals.

Example 9

This is a further example based on Example 6. The packings of the packing layer 2.5 are resistant to a temperature of no less than 400° C.;
the packings are resistant to rapid cooling under 400° C.; and
the sea water delivering device 2.12 comprises a mechanism for controlling injection of sea water, which is used to start and stop delivery of sea water in the course of discharging high-temperature flue gas, and to regulate the flow rate of sea water according to requirements. In this way, when the delivery of sea water is started and stopped, and when the sea water flow rate varies greatly, the packings can still withstand the sharp change of temperature.

Example 10

This is a further example based on Example 4. As shown in FIGS. 3 and 4, the exhaust pipe for high-temperature flue gas 1.1 extends to the inlet for high-temperature flue gas 2.7 from the bottom of the main body of cooling and cleaning device 2.1;
the liquid pool 2.6 is defined by an outer surface of the exhaust pipe for high-temperature flue gas 1.1 and an inner surface of the main body of cooling and cleaning device 2.1; and
a liquid proof cover 2.8 for preventing the scrubbing seawater from entering is located over the inlet for high-temperature flue gas 2.7.

Such configuration has advantages that it is convenient to add a cooling and cleaning device in the pipe section of the vertical exhaust pipe for high-temperature flue gas 1.1 by remodeling or newly building. The exhaust pipe for high-temperature flue gas 1.1 and the main body of cooling and cleaning device 2.1 are in the same straight passage of flue gas. Such configuration has other advantages that the flue gas resistance is relatively small and the efficiency of combustion facilities 1 is relatively high.

Example 11

This is a further example based on Example 4. As shown in FIG. 4, in the present example, the exhaust pipe for high-temperature flue gas 1.1 is connected to the side of the main body of cooling and cleaning device 2.1. Such configuration has advantages that it is convenient to add a cooling and cleaning device in the pipe section of bent exhaust pipe for high-temperature flue gas by remodeling or newly building, and it is applicable for the design of liquid pool in the case that the inner diameter of the main body of cooling and cleaning device 2.1 is less than the inner diameter of the exhaust pipe for high-temperature flue gas 1.1. The cooled and cleaned flue gas can be discharged to the atmosphere from the outlet for low-temperature clean flue gas 2.10 or from the outlet for low-temperature clean flue gas 2.10 and the exhaust pipe for low-temperature flue gas 2.11.

Combined with the figures and examples, further description on the technical solution and technical effects of the present invention is provided as below.

Example 12

Figure 7:
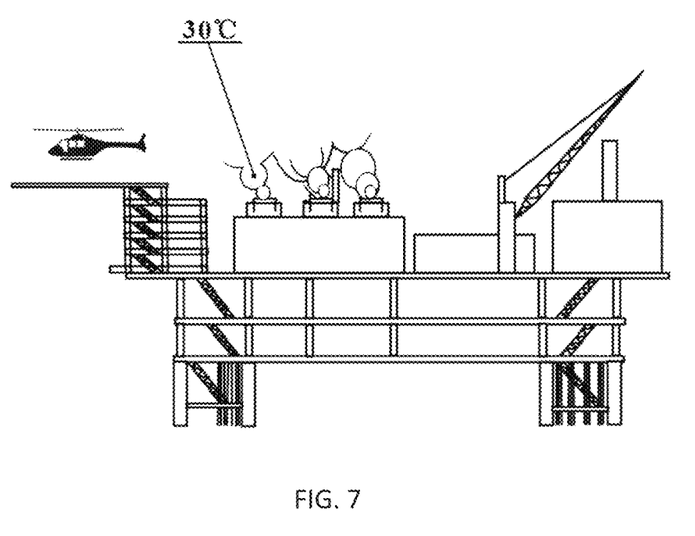
FIG. 7 is a schematic diagram showing the technical effects in Example 6 and Example 12.

This is a preferred example based on Example 4. There are three exhaust pipes for high-temperature flue gas 1.1. They are connected to the combustion facilities 1 of three 9600 KW crude oil generators installed on the ocean platform. Each exhaust pipe for high-temperature flue gas 1.1 is remodeled to install a main body of the cooling and cleaning device 2.1. The inner diameter of the main body of cooling and cleaning device is 1.3 times of the inner diameter of the exhaust pipe for high-temperature flue gas. The original thermal insulation layer 1.2 for insulating the heat of the high-temperature flue gas is very thick. The outer diameter of the newly added main body of cooling and cleaning device 2.1 is only slightly larger (about 1.1 times) than the outer diameter of the original thermal insulation layer 1.2. After the main body of cooling and cleaning device 2.1 is installed, because the outlet for low-temperature clean flue gas 2.10 of the main body of cooling and cleaning device 2.1 is configured for discharging low-temperature gas and an exhaust pipe for low-temperature flue gas 2.11 is joined to the outlet for low-temperature clean flue gas 2.10, the original thermal insulation layer can be removed. Therefore, it saves space for the ocean platform. Moreover, the resistance of flue gas introduced by the main body of cooling and cleaning device 2.1 is very small. The main energy consumption of the cooling and cleaning device 2 is the power consumption of sea water delivering device, which is less than 50 KW and is less than two thousandth (2‰) of the power of emission source.

After the devices of the present invention are installed on the ocean platform, the temperature of exhausted flue gas of the crude oil generator set is reduced from 390° C. to about 30° C. It has never happened that the temperature rise of the flight area of take-off and landing of helicopter above the deck exceeds 2° C. in 3 seconds (British standard CAP437), which is caused by dangerous wind direction. Moreover, the exhaust gas of engine is cleaned. The original color of black and yellow basically disappears, and the sulfur dioxide and smoke dust in the high-temperature flue gas are reduced by 70-80%. The air environment of the ocean platform has been significantly improved, the personnel occupational health has been guaranteed, and the atmospheric environment has been protected.

Example 13

In the present example, a waste heat boiler is installed in the high-temperature exhaust passage of the ocean platform. Although the temperature of flue gas at the outlet of the boiler has been reduced to about 200° C., it is still frequent to be in a dangerous situation that the temperature rise of the flight area of take-off and landing of helicopter above the deck exceeds 2° C. within 3 seconds (British standard CAP437). It is still necessary to install the cooling and cleaning device 2 of the present invention to reduce the temperature of flue gas to about 30° C. In the present example, the inner diameter of the main body of cooling and cleaning device 2.1 is 1.2 times of the inner diameter of the exhaust pipe for high-temperature flue gas 1.1, and the height of the packing layer 2.5 is 0.6 times of the exhaust pipe for high-temperature flue gas 1.1.

In the existing technical scheme, the engine is arranged on the top of the platform to avoid the penetrating heat of exhaust pipes for high-temperature flue gas. However, in the present example, the engine is arranged on the bottom of the platform, thereby lowering the center of gravity of the platform and increasing the stability of the platform. The present invention also eliminates the problems of the exhaust pipes for high-temperature flue gas and their arrangement in the prior art, reduces the running cost of the ocean platform, and makes the design and construction of the ocean platform more advanced, more reasonable, safer and more environmental friendly.

The protection scope of the claim of the present invention is not limited to the above examples.

The invention claimed is:

1. A process for discharging high-temperature flue gas safely from an ocean platform, wherein the process comprises steps of:
    discharging high-temperature flue gas, of a type which affects flight safety of take-off and landing of a helicopter, from combustion facilities of the ocean platform, having a flight area for take-off and landing of the helicopter, into a main body of a cooling and cleaning device through an exhaust pipe for high-temperature flue gas of the combustion facilities, while sea water is injected into the main body of cooling and cleaning device;
    wherein,
    the injected sea water passes through a water distributor located at an upper part in the main body of the cooling and cleaning device, and is sprayed downwards from the water distributor to be used as scrubbing sea water;
    the high-temperature flue gas enters into a lower part under the water distributor from an inlet for high-temperature flue gas located at a lower part in the main body of the cooling and cleaning device, and the high-temperature flue gas is scrubbed by the sprayed sea water to be low-temperature clean flue gas;
    the low-temperature clean flue gas passes through the water distributor and a mist eliminator for removing liquid drops which is located over the water distributor, and is discharged into atmosphere finally through an outlet for low-temperature clean flue gas located at a top of the main body of cooling and cleaning device; and
    the sea water for scrubbing the high-temperature flue gas is collected to a liquid pool located at a lower part of the main body of cooling and cleaning device and then discharged into the ocean.

2. The process for discharging high-temperature flue gas safely from an ocean platform of claim 1, wherein the step of spraying scrubbing sea water downwards from the water distributor comprises spraying scrubbing sea water to an empty space under the water distributor;
    a flow rate of the sea water injected into the main body of cooling and cleaning device is selected in a range according to a principal that a ratio of flue gas flow rate to sea water flow rate is 20-1000, wherein the flue gas flow rate is measured in $Nm^3/h$ and the sea water flow rate is measured in $m^3/h$;
    an inner diameter of the main body of the cooling and cleaning device is 0.5-10 times of an inner diameter of the exhaust pipe for high-temperature flue gas; and
    a height of the empty space under the water distributor is 0.1-10 times of the inner diameter of the exhaust pipe for high-temperature flue gas, wherein the height of the empty space refers to a distance between a bottom of the water distributor and a top of the inlet for high-temperature flue gas.

3. The process for discharging high-temperature flue gas safely from an ocean platform of claim 1, wherein the step of spraying scrubbing sea water downwards from the water distributor comprises spraying scrubbing sea water to a packing layer located in an empty space under the water distributor;
    a flow rate of the sea water injected into the main body of cooling and cleaning device is selected in a range according to a principal that a ratio of flue gas flow rate to sea water flow rate is 30-500, wherein the flue gas flow rate is measured in $Nm^3/h$ and the sea water flow rate is measured in $m^3/h$;
    an inner diameter of the main body of the cooling and cleaning device is 1-5 times of an inner diameter of the exhaust pipe for high-temperature flue gas; and
    a height of the packing layer is 0.1-10 times of the inner diameter of the exhaust pipe for high-temperature flue gas.

4. A cooling and cleaning device for carrying out the process for discharging high-temperature flue gas safely from an ocean platform of claim 1, comprising:
    the main body of the cooling and cleaning device;
    the water distributor located at an upper part in the main body of the cooling and cleaning device;
    the mist eliminator located over the water distributor;
    the outlet for low-temperature clean flue gas located over the mist eliminator;
    wherein,
    the water distributor is connected to a sea water inlet of the main body of the cooling and cleaning device and is communicated with a sea water delivering device through pipes;
    the inlet for high-temperature flue gas of the main body of the cooling and cleaning device is connected to the exhaust pipe for high-temperature flue gas;
    the liquid pool and a water discharging outlet are located at the bottom of the main body of the cooling and cleaning device;
    the inlet for high-temperature flue gas is located under the water distributor; and
    the inner diameter of the main body of the cooling and cleaning device is 0.5-10 times of the inner diameter of the exhaust pipe for high-temperature flue gas.

5. The cooling and cleaning device of claim 4, wherein the empty space is located between the bottom of the water distributor and the top of inlet for high-temperature flue gas, and the height of the empty space is 0.1-10 times of the inner diameter of the exhaust pipe for high-temperature flue gas.

6. The cooling and cleaning device of claim 4, wherein,
    the packing layer is located at the empty space under the water distributor;
    the inlet for high-temperature flue gas is located under the packing layer;
    the inner diameter of the main body of cooling and cleaning device is 1.1-4.5 times of the inner diameter of the exhaust pipe for high-temperature flue gas; and the height of the packing layer is 0.1-10 times of the inner diameter of the exhaust pipe for high-temperature flue gas.

7. The cooling and cleaning device of claim 6, wherein the inner diameter of the main body of cooling and cleaning device is 1.2-3 times of the inner diameter of the exhaust pipe for high-temperature flue gas, and the height of the packing layer is 0.3-3 times of the inner diameter of the exhaust pipe for high-temperature flue gas.

8. The cooling and cleaning device of claim 6, wherein, the packings of the packing layer are resistant to a temperature of no less than 400° C.;

the packings are resistant to rapid cooling under 400° C.; and the sea water delivering device comprises a mechanism for controlling injection of sea water, which is used to start and stop delivery of sea water in the course of discharging high-temperature flue gas, and to regulate the flow rate of sea water.

9. The cooling and cleaning device of claim 5, wherein, the exhaust pipe for high-temperature flue gas extends to the inlet for high-temperature flue gas from the bottom of the main body of cooling and cleaning device;

the liquid pool is defined by an outer surface of the exhaust pipe for high-temperature flue gas and an inner surface of the main body of cooling and cleaning device; and a liquid proof cover for preventing the scrubbing seawater from entering is located over the inlet for high-temperature flue gas.

10. The cooling and cleaning device of claim 6, wherein, the exhaust pipe for high-temperature flue gas extends to the inlet for high-temperature flue gas from the bottom of the main body of cooling and cleaning device;

the liquid pool is defined by an outer surface of the exhaust pipe for high-temperature flue gas and an inner surface of the main body of cooling and cleaning device; and a liquid proof cover for preventing the scrubbing seawater from entering is located over the inlet for high-temperature flue gas.

\* \* \* \* \*